Nov. 3, 1953

A. PETERSON 2,657,727

TIRE CHAIN

Filed Aug. 8, 1951

Alfred Peterson
INVENTOR.

BY *Clarence A. O'Brien
and Harvey B. Jacobson*
Attorneys

Patented Nov. 3, 1953

2,657,727

UNITED STATES PATENT OFFICE 2,657,727

TIRE CHAIN

Alfred Peterson, Lyford, Tex.

Application August 8, 1951, Serial No. 240,848

1 Claim. (Cl. 152—241)

The present invention relates to new and useful improvements in tire chains and more particularly to the provision of side or circumferential chains at the inner and outer sides of the tire and cross chains connected to said side or circumferential chain.

An important object of this invention is to provide a tire chain in which the cross chains are arranged in an inclined or zigzag position whereby movement thereof as the tire moves over the ground is reduced to a minimum to thus reduce wear on the cross chains and on the connectors between the cross chains and the side or circumferential chains.

Another object of this invention is to provide novel connecting means between the cross chains and the side or circumferential chains whereby both the cross chains and the side or circumferential chains may be simultaneously tightened or adjusted.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
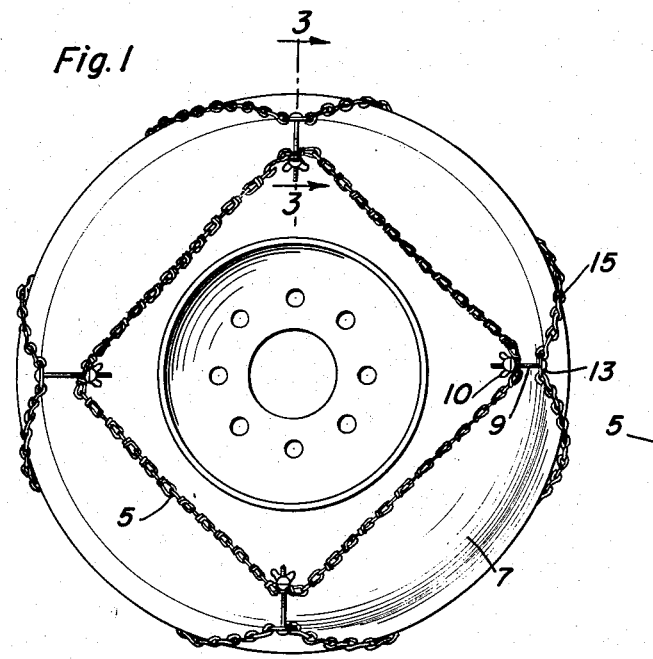
Figure 1 is a side elevational view.

Referring now to the drawing in detail, wherein for the purpose of illustration, I have disclosed a preferred embodiment of the invention, the numerals 5 and 6 designate the side or circumferential chains which are placed at the inner and outer sides respectively of a tire 7. The end link 8 of each chain is placed on a bolt 9 which forms a connector and the chain is held thereon by a wing nut 10 threaded on the bolt. A hook 11 also engages the end link 8 as well as the end link 12 at the opposite end of the chain.

Figure 2:
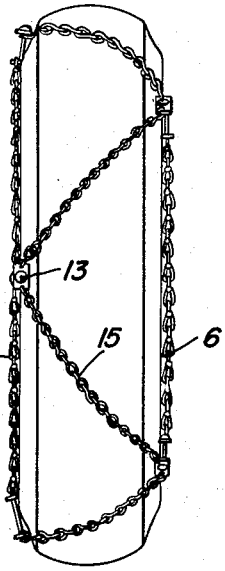
Figure 2 is a view in elevation showing the cross chains.
Figure 3:
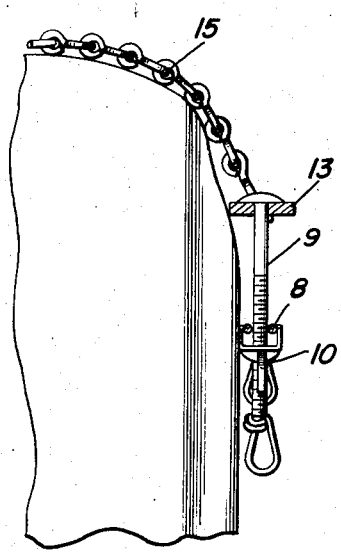
Figure 3 is an enlarged fragmentary sectional view taken on the line 3—3 of Figure 1.
Figure 4:
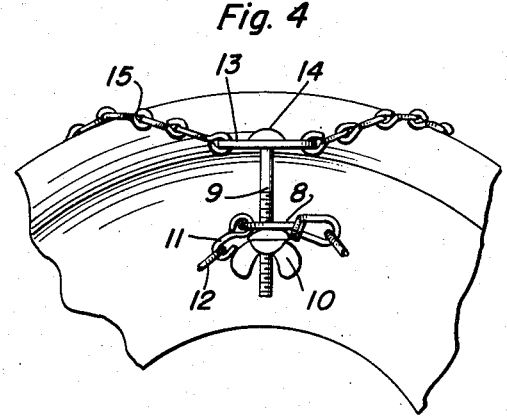
Figure 4 is an enlarged fragmentary side elevational view showing the hook provided for connecting the side or circumferential chain at the inside of the tire to the connector.

A washer or plate 13 is also placed on the bolt 9 against the head 14 of the bolt and cross chains 15 are attached to the washer or plate 13 for the connectors at the opposite sides of the tire and with the cross chains or links 15 inclined in a zigzag arrangement, as shown in Figure 2 of the drawings.

After the cross links or chains 15 and the side or circumferential chains 5 and 6 are placed on the tire, the wing nuts 10 of the several connectors at both the inner and outer sides of the tire may be tightened to thus simultaneously tighten the cross links or chains as well as the side or circumferential chains.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having described the invention, what is claimed as new is:

A tire chain comprising the combination of an inner circumferential side chain and an outer circumferential side chain, a plurality of pairs of cross chains, and a connector for each pair of cross chains for connection with its respective circumferential side chain and including a bolt passing through one of the links of said respective circumferential chain, a nut threaded on one end of the bolt to hold said respective circumferential chain on said end of the bolt, and a plate on the other end of the bolt and to which the pair of cross chains are attached, said bolt being positioned radially with respect to a tire on which the chain is mounted and passing through the center of the plate, said cross chains being attached to the opposite end portions of the plate, and said plate bearing edgewise against the side of the tire to space the bolt therefrom and to reduce lateral strain subjected to the bolt by the cross chains.

ALFRED PETERSON.

References Cited in the file of this patent

UNITED STATES PATENTS

| Number | Name | Date |
|---|---|---|
| 901,654 | Sills | Oct. 20, 1908 |
| 1,486,993 | Stolpe | Mar. 18, 1924 |
| 1,523,499 | Sullivan | Jan. 20, 1925 |
| 1,537,231 | Graves | May 12, 1925 |
| 2,474,521 | Fogarty | June 28, 1949 |